United States Patent [19]

Matsumoto et al.

[11] Patent Number: 4,940,772
[45] Date of Patent: Jul. 10, 1990

[54] PROCESS FOR PRODUCING FLAME RESISTANT POLYESTER

[75] Inventors: Tetsuo Matsumoto; Keizo Tsujimoto, both of Aichi; Katsuto Matsuzawa, Tokyo; Shunichiro Hamada, Aichi; Kouzi Shinogi, Aichi; Satomi Nagai, Aichi; Takayuki Imamura, Aichi; Akiko Kuroyanagi, Aichi, all of Japan

[73] Assignee: Nippon Ester Co., Ltd., Aichi, Japan

[21] Appl. No.: 438,129

[22] Filed: Nov. 20, 1989

Related U.S. Application Data

[63] Continuation of Ser. No. 225,441, Jul. 28, 1988, abandoned.

[51] Int. Cl.$^5$ .............................................. C08G 63/02
[52] U.S. Cl. ................................. 528/272; 528/286; 528/287; 528/296; 528/303; 528/308.1; 528/398; 524/116; 524/117; 524/129; 524/136; 524/139; 524/147; 524/603; 524/706; 523/506
[58] Field of Search ............. 528/272, 286, 287, 296, 528/303, 308.1, 398; 524/116, 117, 129, 136, 139, 147, 706, 603; 523/506

[56] References Cited

U.S. PATENT DOCUMENTS

| | | | |
|---|---|---|---|
| 4,157,436 | 6/1979 | Endo et al. | 528/167 |
| 4,280,991 | 7/1981 | Saito et al. | 524/118 |
| 4,339,376 | 7/1982 | Kasahara et al. | 524/116 |

FOREIGN PATENT DOCUMENTS

62-172017 7/1987 Japan.
62-297146 12/1987 Japan.
63-15823 1/1988 Japan.

*Primary Examiner*—John Kight, III
*Assistant Examiner*—Sam A. Acquah
*Attorney, Agent, or Firm*—Sughrue, Mion, Zinn, Macpeak & Seas

[57] ABSTRACT

A polyester, wherein pendent phosphorus atoms are bound to the main chain of the polyester, having an excellent flame resistance and a high intrinsic viscosity can be stably produced without deteriorating the properties of said polyester by preliminarily copolymerizing a polyester with a specific unsaturated compound and then reacting the unsaturated bond thus-formed with a specific phosphorus compound having a P-H bond.

4 Claims, No Drawings

PROCESS FOR PRODUCING FLAME RESISTANT POLYESTER

This is a continuation of application No. 071 225,441 filed July 28, 1988, now abandoned.

FIELD OF THE INVENTION

This invention relates to a process for producing a flame resistant polyester.

BACKGROUND OF THE INVENTION

Polyesters, in particular, polyethylene terephthalate (PET) having excellent mechanical and chemical properties have been widely applied not only to clothes and industrial fibers, but also to magnetic tapes, photographic films, condenser films and molded products such as bottles.

Recently, it has been required to impart flame resistance to synthetic fibers and various plastic products from the viewpoint of the prevention of the fire. There has been an urgent need, in particular, to establish a process for producing flame resistant PET which is widely available in, for example, clothes, carpets, car seats and industrial films.

There have been proposed various processes for imparting flame resistance to polyesters. Among these processes, it is believed effective to add a phosphorus compound to a polyester. For example, U.S. Pat. No. 4,157,436 has proposed a process for producing a polyester for flame resistant fibers or films which comprises adding a specific phosphorus compound as a flame resistance-imparting component, which would deteriorate neither the properties of the molded product nor the workability, to a polyester and copolymerizing said phosphorus compound therewith.

From an economic viewpoint, however, this process is accompanied by some problems to be solved. Namely, in order to produce a polyester having a high degree of polymerization by this process, it is required to preliminarily convert the phosphorus compound to be added into a compound having a divalent esterifying functional group, which results in an increase in the production cost of the phosphorus compound or makes the production extremely difficult in some cases.

Further, Japanese Patent Publication No. 9178/81 has proposed a process for blending a phosphorus compound of a specific structure with a polyester. However, this process is also accompanied by some disadvantages from a practical viewpoint. That is to say, a phosphorus compound having a functional group which might depolymerize a polyester, such as a P-H bond, might significantly lower the degree of polymerization of the polyester or block the terminal group of the same, to thereby deteriorate the properties of the obtained polyester.

SUMMARY OF THE INVENTION

It is an object of the present invention to provide a process for economically producing a polyester having high flame resistance and accompanied by no deterioration in other properties.

As a result of an extensive investigation to establish a process for producing a flame resistant polyester accompanied by no such problems as described above, it has been found that a process, which comprises preliminarily copolymerizing an unsaturated compound with the main chain of a polyester (i.e., prepolymerization) and subsequently adding a definite amount of a specific phosphorus compound having a P-H bond to said unsaturated bond optionally to such a degree as to give a specific intrinsic viscosity (i.e., postpolymerization), can give a highly excellent product. The present invention has been attained by the findings.

Accordingly, the present invention aims at providing a process for producing a flame resistant polyester which comprises: preliminarily copolymerizing a polyester with 0.5 to 25% by mol, based on the total acid components of the polyester, of an unsaturated compound having esterifying functional group(s); and then reacting the obtained prepolymer with a phosphorus compound of the following formula (1) in an amount of not exceeding the equivalent of the unsaturated bond of the unsaturated compound:

wherein $R_1$ and $R_2$ may be the same or different from each other and each represents an alkyl group having 1 to 20 carbon atoms (e.g., methyl, ethyl, propyl, butyl, octyl, oleyl, etc.), an aryl group having 6 to 20 carbon atoms (e.g., phenyl, naphthyl, diphenyl, etc.), an alkoxy group having 1 to 20 carbon atoms (e.g., methoxy, ethoxy, propoxy, butoxy, octoxy, oleyloxy, etc.) or an aryloxy group having 6 to 20 carbon atoms (e.g., phenoxy, naphthoxy, diphenoxy, etc.), or $R_1$ and $R_2$ may combine to form a ring with phosphorus atom; and n is an integer of 0 or 1.

DETAILED DESCRIPTION OF THE INVENTION

Examples of the polyester to be copolymerized with an unsaturated compound having esterifying functional group(s) in the present invention include PET and polybutylene terephthalate (PBT) optionally containing a small amount of copolymerizable component(s) such as isophthalic acid, 4-hydroxybenzoic acid, 5-sodium sulfoisophthalic acid, adipic acid, trimellitic acid, diethylene glycol, propylene glycol, 1,4-cyclohexane dimethanol or pentaerythritol.

The unsaturated compound having esterifying functional group(s) to be used in the present invention is not particularly restricted. It is preferable that the unsaturated compound has one to four, more preferably two, carboxyl or hydroxyl groups. Examples thereof include unsaturated dicarboxylic acids such as fumaric acid, maleic acid, mesaconic acid, citraconic acid, glutaconic acid and itaconic acid, as well as anhydrides and esters thereof; and unsaturated diols such as 2-butene-1,4-diol and 3-butene-1,2-diol, as well as esters thereof. Among these compounds, maleic anhydride is the most preferable one.

In the present invention, the unsaturated compound having esterifying functional group(s) is copolymerized with polyester at a ratio of 0.5 to 25% by mol, preferably 1 to 10% by mol, and more preferably 2 to 5% by mol, based on the total acid components of the polyester. When the copolymerization ratio is less than the above range, the copolymerization exerts substantially no effect. When the copolymerization ratio exceeds the above range, on the other hand, the polyester obtained by the prepolymerization (i.e., prepolymer) has partial three-dimensional structure(s), which deteriorates the properties thereof. Thus, it is impossible to obtain an excellent polyester in these cases.

The polyester copolymerized with the unsaturated compound having esterifying functional group(s) to be used in the present invention can be prepared by a well known method for preparing a polyester which comprises, for example, esterification or transesterification followed by condensation polymerization.

The unsaturated compound having esterifying functional group(s) may be added at any point prior to the completion of the condensation polymerization, i.e., either before or after the esterification or transesterification. It is advantageous to carry out the reaction under elevated pressure of approximately 0.05 to 10 kg/cm² Gauge until the esterification or transesterification is substantially completed to thereby suppress the vaporization of the unsaturated compound. This is further advantageous in that the decarboxylation can be suppressed thereby when the unsaturated compound is an unsaturated dicarboxylic acid derivative such as maleic anhydride.

Examples of the phosphorus compound of the formula (1) to be used in the present invention include the following compounds.

Among the compounds represented by the formula (1), pentavalent phosphorus compounds are frequently more stable and thus more preferable than trivalent ones.

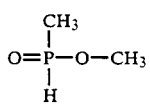
(a)

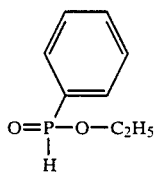
(b)

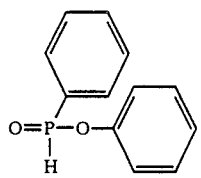
(c)

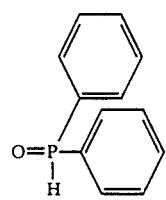
(d)

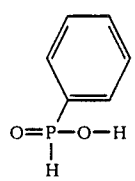
(e)

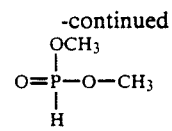
(f)

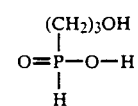
(g)

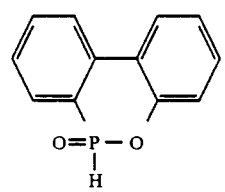
(h)

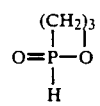
(i)

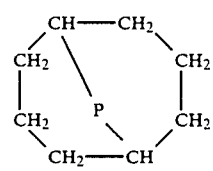
(j)

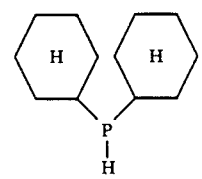
(k)

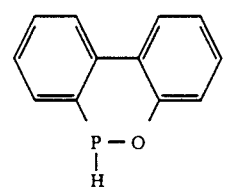
(l)

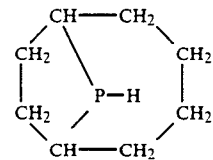
(m)

The most preferable example of the phosphorus compound is the one represented by the following formula (2):

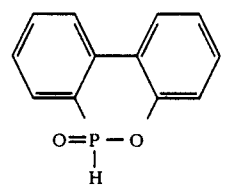
(2)

wherein each benzen ring may be substituted by one or more atoms or groups selected from the group consisting of a halogen atom, an alkyl group having 1 to 20 carbon atoms, an aryl group having 6 to 20 carbon atoms, an alkoxy group having 1 to 20 carbon atoms or an aryloxy group having 6 to 20 carbon atoms.

When the amount of the phosphorus compound of the formula (1) to be reacted with the prepolymer in the present invention is too small, the resulting polyester has an insufficient flame resistance. On the other hand, when the amount of the phosphorus compound is too large, the physical properties of the resulting polyester might be deteriorated. Thus, the phosphorus compound may be employed in an amount of 0.5 to 25% by mol, preferably 1.5 to 10% by mol and more preferably 2 to 3.5% by mol, based on the total acid components of the polyester.

From a stoichiometric viewpoint, 1.0 equivalent of the P-H bond of the phosphorus compound, based on the unsaturated bond of the unsaturated compound to be copolymerized, may be employed. However, it is sometimes observed in practice that some portion of the unsaturated compound is vaporized; that the unsaturated compound is cleaved by thermal decomposition; or that a side reaction such as the one between the P-H bond and the terminal group of the polyester occurs. Thus, a three-dimensional structure may be formed in the polymer or a blocked terminal group may lower the intrinsic viscosity of the polymer in these cases.

In order to avoid these phenomena, it is appropriate to carry out the process under the following conditions.

Namely, the phosphorus compound is employed in such an amount as to give the P-H bond ranging from 0.7 to 1.0 equivalent of the unsaturated bond of the unsaturated compound. When the amount of the phosphorus compound is less than the above range, an increase in the intrinsic viscosity of the resulting polyester obtained by the postpolymerization (postpolymer) would cause the formation of a three-dimensional structure therein, which might deteriorate the properties of the polyester. When the amount of the phosphorus compound exceeds the above range, on the other hand, an undesirable result, e.g., no increase in the intrinsic viscosity of the resulting polyester, might occur.

It is preferable to add the phosphorus compound of the formula (1) to the prepolymer when the intrinsic viscosity of the prepolymer reaches 0.25 to 0.48, especially 0.30 to 0.45.

At the preparation of the prepolymer, the condensation polymerization may be carried out under a reduced pressure of approximately 0.01 to 10 Torr at a temperature not exceeding 260° C, preferably at a temperature ranging from the melting point of the polyester to 260° C, until the intrinsic viscosity reaches 0.35 to 0.48, preferably 0.4 to 0.45. Then, the prepolymer thus obtained is reacted with the phosphorus compound represented by the formula (1).

The resulting polymer is further subjected to condensation polymerization, if required, under a reduced pressure of approximately 0.01 to 10 Torr at a temperature not exceeding 270° C, preferably from the melting point of the polyester to 265° C, until a definite intrinsic viscosity (generally 0.5 or more, preferably 0.5 to 1.0) is achieved.

As described above, it is ideal that the ratio of the equivalent of the unsaturated bond of the unsaturated compound to be copolymerized to that of the P-H bond of the phosphorus compound is 1.0. In order to approximate this ratio to 1.0 as close as possible and to elevate the intrinsic viscosity of the postpolymer while substantially forming no three dimensional structure, it is preferable to set the above ratio to 0.7 to 1.0 and to adjust the intrinsic viscosity of the prepolymer to 0.25 to 0.48. Thus, the intrinsic viscosity of the postpolymer may be sufficiently elevated and the formation of any three dimensional structure would not proceed in practice.

Namely, when the phosphorus compound is added to the prepolymer having an intrinsic viscosity less than 0.25, the intrinsic viscosity of the resulting polyester would not be elevated. When the intrinsic viscosity of the prepolymer exceeds 0.48, the prepolymerization temperature exceeds 260° C or the postpolymerization temperature exceeds 270° C, otherwise three dimensional structure(s) would be sometimes formed in the resulting polyester, which might deteriorate the properties thereof.

More particularly when the intrinsic viscosity of the prepolymer reaches approximately 0.45, the pressure in the reaction system is adjusted to atmospheric or slightly elevated under pressure of approximately 50 Torr nitrogen gas. Then, a phosphorus compound of the formula (1) is added to the prepolymer at a temperature of approximately 260° C. The resulting mixture is allowed to react for 5 to 60 minutes, preferably 10 to 30 minutes, at this temperature under stirring. Subsequently, the resulting postpolymer is subjected to condensation polymerization under reduced pressure of 0.01 to 10 Torr at a temperature of approximately 260° C until the intrinsic viscosity of the postpolymer reaches 0.5 or above.

During this stage, some phosphorus compounds might lower the intrinsic viscosity of the polyester.

Thus, the properties of the polyester would vary from batch to batch or the formation of three dimensional structure(s) of the polyester would proceed, unless the degree of polymerization, the ratio of the equivalence of the unsaturated bond of the unsaturated compound to that of the P-H bond of the phosphorus compound or the time at which the phosphorus compound is added are appropriately selected.

The condensation polymerization is carried out in the presence of a catalyst. Examples of catalysts include commonly employed metal compounds such as germanium, tin, titanium, cobalt and antimony compounds and organic sulfonic acid compounds.

The catalyst may be added in an amount of $1 \times 10^{-5}$ to $5 \times 10^{-2}$ mol, preferably $5 \times 10^{-5}$ to $5 \times 10^{-3}$ mol and still more preferably $1 \times 10^{-4}$ to $5 \times 10^{-4}$ mol, per mol of the total acid components of the polyester.

The phosphorus compound of the formula (1) sometimes has a reducing effect. When such a phosphorus compound is to be used, it is undesirable to use a catalyst which tends to be affected by a reducing atmosphere.

In the present invention, various additives, for example, stabilizers such as hindered phenol compounds, color modifiers such as fluorescent agents and colorants and pigments such as titanium dioxide may be further employed.

Thus, the essence of the present invention lies in a process for producing a flame resistant polyester which comprises preliminarily copolymerizing an unsaturated compound with polyester; and adding a specific phosphorus compound having a P-H bond to said unsaturated bond to thereby induce the reaction having, for example, the following scheme:

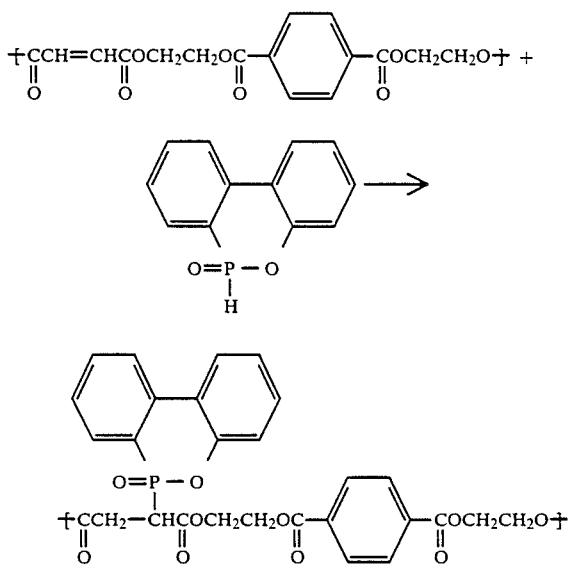

Thus, a highly flame resistant polyester, wherein pendent phosphorus atoms are bound to the main polyester chain, can be obtained without deteriorating the properties of the polyester.

The formation of any three dimensional structures in the polyester can be substantially inhibited by adding 0.7 to 1.0 equivalent, based on the unsaturated bond of the unsaturated compound, of the phosphorus compound to the prepolymer, at a temperature of the prepolymerization not exceeding 260° C and the intrinsic viscosity of the prepolymer and further subjecting the postpolymer to condensation polymerization at a temperature not exceeding 270° C, if required.

To further illustrate the present invention, the following nonlimiting examples are presented.

In each example, the intrinsic viscosity of a polyester [$\eta$]represents a value determined at a temperature of 20° C by using a mixed solvent of phenol and tetrachloroethane (1/1 by weight).

The content of phosphorus atoms in a polyester is determined by fluorescent X-ray analysis.

The flame resistance of a polyester was determined in the following manner. Namely, polyester fibers were spun in a conventional manner with a spinning machine at a rate of 1,400 m/min and then stretched at a rate of 630 m/min to give an elongation of 30%. The yarns thus obtained were knitted cylindrically. Then, 1 g of the knitted material was rounded to a length of 10.0 cm and inserted into a wire coil of 10.0 mm in diameter. Then, it was supported at an angle of 45° and ignited with a microburner having a 0.64 mm bore. Then, the burner was removed from the sample. When the fire went out, the ignition was repeated. Thus, the number of the ignitions, i.e., flame-contact number required for completely burning the sample was recorded. The flame-contact number is expressed as the mean of five samples.

On the other hand, the yarn properties were evaluated by determining the strength of the fibers, prior to the evaluation of the flame resistance, in four grades according to the following criteria.

A: Strength of 4.5 g/d or above;
B: Strength of 4 to 4.5 g/d;
C: Strength of 3 to 4 g/d; and
D: Strength of less than 3 g/d.

EXAMPLE 1

Bis($\alpha$-hydroxyethyl terephthalate) and its low polymer (BHET) were introduced into an esterification tank and a slurry comprising terephthalic acid (TPA) and ethylene glycol (EG) at a TPA/EG ratio by mol of 1/1.6 was continuously supplied thereto. The resulting mixture was allowed to react at 255° C over an average residence time of 6 hours. Thus, BHET having an esterification ratio of 95% was continuously obtained. This BHET was transferred into a polymerization tank and heated to 260° C. A molten mixture (at approximately 50° C) of maleic anhydride (MA) and EG at an MA/EG ratio by mol of 1/0.8 was added thereto in such an amount as to give 2.5% by mol of the MA based on the total acid components of the polyester. Then, the resulting mixture was esterified at 260° C under a nitrogen atmosphere and pressure of 800 Torr for 45 minutes. Then, $2.5 \times 10^{-4}$ mol, per mol of the acid components, of germanium dioxide was added as a catalyst in the form of a solution in EG. The pressure in the system was slowly reduced to 0.3 Torr within 75 minutes. Then, the condensation polymerization was continued under these conditions for additional 90 minutes. Thus, the intrinsic viscosity of the polymer reached 0.45. Then, the pressure in the reaction system was elevated again up to 800 Torr with nitrogen gas and the phosphorus compound (h) [9,10-dihydro-9-oxa-10-phosphaphenanthrene-10-oxide (HCA)]in a molten state (at approximately 120° C) was added thereto in such an amount as to give 2.0% by mol of phosphorus atoms per mol of the total acid components of the polyester, i.e., an MA:HCA ratio by mol of 1:0.8. The resulting mixture was stirred at 260° C for 20 minutes. Then, the pressure in the reaction system was slowly reduced to 0.3 Torr within 30 minutes. The reaction was continued under these conditions for an additional 4 hours.

The polymer thus obtained had an intrinsic viscosity of 0.65, a melting point of 250° C and a residual ratio of phosphorus of 99%. Fibers of this polymer showed a flame-contact number of 4.0.

The yarn properties of the polymer were evaluated as A.

The polymer was enclosed in a tube and subjected to methanolysis at 230° C for 3 hours. Then, a phosphorus compound was collected therefrom by gas chromatography. The phosphorus compound was analyzed by infrared absorption spectrometry and nuclear magnetic resonance spectrometry. The results thus obtained and the comparison of the elemental analysis data of the compound (P=8.51%, C=60.1% and H=4.65%) with theoretical values thereof (P=8.60%, C=60.0% and H=4.76%) indicated that the phosphorus compound had the following structure and that the phosphorus compound (h) added to the polyester had reacted with the unsaturated bonds in the main chain of the polyester:

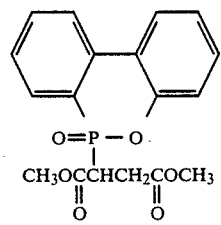

EXAMPLES 2 TO 5 AND COMPARATIVE EXAMPLES 1 AND 2

The procedure of Example 1 was repeated except that the amounts of the MA and HCA and the [η]of the prepolymer to which the HCA was to be added were varied to thereby give a polymer.

Table 1 shows the properties of these polymers thus obtained.

In Comparative Example 2, the [η]of the finally obtained polymer was saturated at 0.46. Thus, the polymerization was forced to be completed.

EXAMPLE 6 AND COMPARATIVE EXAMPLE 3

The procedure of Example 1 was repeated except that the compound (d) as cited above or triphenyl phosphate was employed as the phosphorus compound to thereby give a polymer.

EXAMPLES 7 TO 9

The procedure of Example 1 was repeated except that maleic acid, itaconic acid or 2-butene-l,4-diol was employed as the unsaturated compound to thereby give a polymer. Table 1 shows the properties and flame-contact number of these polymers.

slowly reduced to 0.3 Torr within 75 minutes. Then, condensation polymerization was carried out under these conditions at 240° C for 90 minutes. Thus, the [η]of the polymer reached 0.48. Then, the procedure of Example 1 was followed except that the reaction was effected at 240° C to thereby give a polymer.

The polymer thus-obtained had an intrinsic viscosity of 0.80, a melting point of 233° C and a residual ratio of phosphorus of 99%. The flame-contact number of fibers of this polymer was 3.2.

The yarn properties of this polymer was evaluated as B.

Thus, a polyester, wherein pendent phosphorus atoms are bound to the main chain of the polyester, having an excellent flame resistance and a high intrinsic viscosity, can be stably produced by the process of the present invention without deteriorating the properties of said polyester.

While the invention has been described in detail and with reference to specific embodiments thereof, it will be apparent to one skilled in the art that various changes and modifications can be made therein without departing from the spirit and scope thereof.

What is claimed is:

1. A process for producing a flame resistant polyester which comprises: preliminary copolymerizing a polyester selected from the group consisting of polyethylene terephthalate and polybutylene terephthalate with 0.5 to 25% by mol, based on the total acid components of said polyester, of an unsaturated compound having esterifying functional group(s); and then reacting the obtained prepolymer with a phosphorous compound represented by the following formula in an amount not exceeding the equivalent of the unsaturated bond of said unsaturated compound:

TABLE 1

| | Unsaturated Compound | | Phosphorus Compound | | Polymerization | Properties of Polyester | | | | |
|---|---|---|---|---|---|---|---|---|---|---|
| Example No. | Compound | Amount (mol %) | Compound | Amount (mol %) | [η] | [η] | m.p. (°C.) | Residual Ratio of Phosphorus (%) | Flame-Contact No. | Yarn Properties |
| Example 1 | Maleic Anhydride | 2.5 | (h) | 2.0 | 0.45 | 0.65 | 250 | 99 | 4.0 | A |
| Example 2 | " | 3.5 | " | 3.0 | 0.45 | 0.64 | 249 | 98 | 4.4 | B |
| Example 3 | " | 2.0 | " | 2.0 | 0.48 | 0.60 | 251 | 96 | 4.0 | A |
| Example 4 | " | 6.0 | " | 4.5 | 0.30 | 0.51 | 246 | 98 | 4.8 | B |
| Example 5 | " | 2.5 | " | 2.0 | 0.43 | 0.63 | 250 | 98 | 4.0 | A |
| Example 6 | " | " | (d) | " | 0.45 | 0.62 | 249 | 100 | 4.0 | B |
| Example 7 | Maleic Acid | " | (h) | " | 0.45 | 0.60 | 250 | 98 | 3.8 | B |
| Example 8 | Itaconic Acid | " | " | " | 0.45 | 0.68 | 251 | 99 | 3.8 | B |
| Example 9 | 2-Butene-1,4-diol | " | " | " | 0.44 | 0.69 | 249 | 96 | 4.0 | B |
| Comparative Example 1 | Maleic Anhydride | 2.5 | (h) | 1.5 | 0.45 | 0.68 | 250 | 99 | 3.6 | C |
| Comparative Example 2 | " | " | " | 3.0 | 0.45 | 0.46 | 251 | 93 | 4.2 | D |
| Comparative Example 3 | " | " | Triphenyl Phosphate | " | 0.45 | 0.51 | 250 | 82 | 2.8 | D |

EXAMPLE 10

A mixture of dimethyl terephthalate (DMT) and 1,4-butanediol (BD) at a DMT/BD ratio by mol of ½ and $2.4 \times 10^{-4}$ mol per mol of the acid components of tetrabutyl titanate (TBT), which was used as a catalyst, were fed into an autoclave and transesterified therein at 240° C.

Then MA was added thereto in an amount of 2.5% by mol based on the total acid component. Further, $2.6 \times 10^{-4}$ mol per mol of the acid components of TBT was added thereto and the pressure in the system was

wherein $R_1$ and $R_2$ may be either the same or different from each other and each represents an alkyl group having 1 to 20 carbon atoms, an aryl group having 6 to 20 carbon atoms, an alkoxy group having 1 to 20 carbon atoms or an aryloxy group having 6 to 20 carbon atoms, or $R_1$ or $R_2$ may combine to form a ring with phosphorous atom.

2. A process as set forth in claim 1, wherein said polyester-forming component and said unsaturated compound are esterified or transesterified under elevated pressure and then subjected to condensation polymerization at the copolymerization of said unsaturated compound with said polyester.

3. A process as set forth in Claim 1, wherein said unsaturated compound is maleic anhydride.

4. A process as set forth in claim 1, wherein said phosphorus compound is a compound represented by the following formula (2):

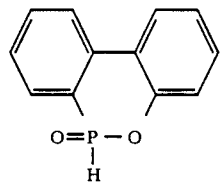
(2)

wherein each benzene ring may be substituted by one or more atoms or groups selected from the group consisting of a halogen atom, an alkyl group having 1 to 20 carbon atoms, an aryl group having 6 to 20 carbon atoms, an alkoxy group having 1 to 20 carbon atoms or an aryloxy group having 6 to 20 carbon atoms.

* * * * *

UNITED STATES PATENT AND TRADEMARK OFFICE
CERTIFICATE OF CORRECTION

PATENT NO. : 4,940,772

DATED : July 10, 1990

INVENTOR(S) : Tetsuo Matsumoto, Kouzi Shinogi,
Katsuto Matsuzawa and Satomi Nagai It is certified that error appears in the above-identified patent and that said Letters Patent is hereby corrected as shown below:

On the title page, substitute for the listed inventors and residences thereof the following.

[75] Inventors:  Tetsuo Matsumoto; Kouzi Shinogi, both of Okazaki; Katsuto Matsuzawa, Tokyo; Satomi Nagai, Toyohashi, all of Japan.

Signed and Sealed this

Fifth Day of November, 1991

*Attest:*

HARRY F. MANBECK, JR.

*Attesting Officer*    *Commissioner of Patents and Trademarks*